US010311500B2

(12) United States Patent
Williams et al.

(10) Patent No.: US 10,311,500 B2
(45) Date of Patent: Jun. 4, 2019

(54) METHODS AND SYSTEMS FOR DEVELOPER ONBOARDING FOR SOFTWARE-DEVELOPMENT PRODUCTS

(71) Applicant: FACEBOOK, INC., Menlo Park, CA (US)

(72) Inventors: Reagan Williams, San Francisco, CA (US); Benjamin Golub, San Francisco, CA (US); Eric Osgood, Mountain View, CA (US); Austin Dobrik, San Francisco, CA (US)

(73) Assignee: Facebook, Inc, Menlo Park, CA (US)

( * ) Notice: Subject to any disclaimer, the term of this patent is extended or adjusted under 35 U.S.C. 154(b) by 0 days.

(21) Appl. No.: 15/255,004

(22) Filed: Sep. 1, 2016

(65) Prior Publication Data
US 2018/0060041 A1 Mar. 1, 2018

(51) Int. Cl.
*G06Q 30/06* (2012.01)
*G06F 8/71* (2018.01)

(52) U.S. Cl.
CPC ........... *G06Q 30/0631* (2013.01); *G06F 8/71* (2013.01)

(58) Field of Classification Search
CPC ..... G06F 8/00; G06F 8/30; G06F 8/61; G06F 8/65; G06Q 30/0631; G06Q 50/01
USPC ......................................................... 717/101
See application file for complete search history.

(56) References Cited

U.S. PATENT DOCUMENTS

| 5,592,672 | A * | 1/1997 | Grewal | H04Q 3/0025 709/238 |
| 7,127,705 | B2 * | 10/2006 | Christfort | G06F 8/20 707/999.004 |
| 7,356,590 | B2 * | 4/2008 | Wilson | G06F 9/542 709/200 |
| 8,707,276 | B2 * | 4/2014 | Hill | G06F 8/70 709/202 |
| 9,118,550 | B2 * | 8/2015 | Yang | G06F 8/61 |
| 9,299,099 | B1 * | 3/2016 | Jayaram | G06Q 30/0631 |
| 9,767,487 | B2 * | 9/2017 | Schechter | G06Q 30/0271 |
| 2003/0233636 | A1 * | 12/2003 | Crawford | G06F 11/28 717/130 |
| 2004/0030740 | A1 * | 2/2004 | Stelting | G06F 8/36 709/201 |
| 2007/0010195 | A1 * | 1/2007 | Brown | H04H 60/73 455/3.06 |
| 2007/0016672 | A1 * | 1/2007 | Wilson | G06F 9/542 709/224 |
| 2008/0294716 | A1 * | 11/2008 | Couvreur | G06Q 30/02 709/203 |

(Continued)

Primary Examiner — Jason D Mitchell
(74) Attorney, Agent, or Firm — Morgan, Lewis & Bockius LLP

(57) ABSTRACT

A server system determines an adoption state for a first software-development product of a plurality of software-development products offered to software developers by a provider associated with the server system. The adoption state indicates an extent to which the first product has been implemented by a software developer for use in connection with a first application. In accordance with the determined adoption state for the first product, the server system performs at least one of: providing a reminder to the software developer to implement the first product in connection with the first application; and providing a notification of availability of a second product of the plurality of products in connection with the first application.

18 Claims, 9 Drawing Sheets

(56) References Cited

U.S. PATENT DOCUMENTS

| | | | | |
|---|---|---|---|---|
| 2009/0124251 A1* | 5/2009 | Niccolini | G06F 8/61 | 455/425 |
| 2010/0312724 A1* | 12/2010 | Pinckney | G06N 99/005 | 706/11 |
| 2011/0099549 A1* | 4/2011 | Sriraghavan | G06Q 10/101 | 718/100 |
| 2011/0112899 A1* | 5/2011 | Strutton | G06Q 30/02 | 705/14.41 |
| 2011/0161912 A1* | 6/2011 | Eteminan | G06F 8/20 | 717/101 |
| 2012/0290399 A1* | 11/2012 | England | G06O 30/0282 | 705/14.66 |
| 2014/0130065 A1* | 5/2014 | Wang | G06F 11/34 | 719/328 |
| 2014/0279208 A1* | 9/2014 | Nickitas | G06Q 30/0631 | 705/26.7 |
| 2014/0280888 A1* | 9/2014 | McMillan | H04L 43/04 | 709/224 |
| 2014/0372998 A1* | 12/2014 | Salameh | G06F 8/65 | 717/169 |
| 2015/0006328 A1* | 1/2015 | Yoon | G06Q 30/0629 | 705/26.64 |
| 2015/0052144 A1* | 2/2015 | Mari | G06F 8/24 | 707/740 |
| 2015/0088663 A1* | 3/2015 | Schechter | G06Q 30/0271 | 705/14.67 |
| 2015/0128103 A1* | 5/2015 | Stratton | G06F 8/00 | 717/100 |
| 2015/0135160 A1* | 5/2015 | Gauvin | H04W 4/001 | 717/109 |
| 2016/0050287 A1* | 2/2016 | Golub | H04L 67/22 | 709/217 |
| 2016/0171588 A1* | 6/2016 | Linden | G06Q 30/0631 | 705/26.7 |
| 2016/0188671 A1* | 6/2016 | Gupta | G06F 17/30528 | 707/722 |
| 2017/0132688 A1* | 5/2017 | Freund | G06Q 30/0631 | |
| 2017/0262825 A1* | 9/2017 | Conway | G06Q 30/00 | |

* cited by examiner

METHODS AND SYSTEMS FOR DEVELOPER ONBOARDING FOR SOFTWARE-DEVELOPMENT PRODUCTS

TECHNICAL FIELD

This relates generally to software-development products, including but not limited to facilitating implementation of software-development products based on product adoption states.

BACKGROUND

Online service platforms, such as social-networking websites, often provide software developers with the ability to create and share applications with a community of users on the service platforms. To assist software developers in this process, service platforms may offer software-development products for use in connection with creating or managing applications, such as utilities for providing analytics or software integrations for providing additional functionalities.

With growing lists of available development products, however, some may be less relevant to a particular developer, while other relevant and potentially more useful products may go unnoticed and un-adopted by developers.

SUMMARY

Accordingly, there is a need for methods, systems, and interfaces for facilitating implementation of software-development products based on product adoption states. The adoption of software-development products by new and existing developers is tracked to remind developers to implement and provide recommendations of development products, for example. Such methods and interfaces optionally complement or replace conventional methods for implementing software-development products.

In accordance with some embodiments, a method is performed at a server system (e.g., a social-network system) with one or more processors and memory storing instructions for execution by the one or more processors. The method includes determining an adoption state for a first software-development product of a plurality of software-development products offered to software developers by a provider associated with the server system. The adoption state indicates an extent to which the first product has been implemented by a software developer for use in connection with a first application. In accordance with the determined adoption state for the first product, the server system performs at least one of: providing a reminder to the software developer to implement the first product in connection with the first application; and providing a notification of availability of a second product of the plurality of products in connection with the first application.

In accordance with some embodiments, a server system (e.g., a social-network system) includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the server system, cause the electronic device to perform the operations of the method described above.

Thus, server systems are provided with more effective methods for facilitating implementation of software-development products based on product adoption states, thereby increasing the effectiveness and efficiency of, and software-developer satisfaction with services provided by, such systems.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first adoption state could be termed a second adoption state, and, similarly, a second adoption state could be termed a first adoption state, without departing from the scope of the various described embodiments. The first adoption state and the second adoption state are both portions of the item of content, but they are not the same portion.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
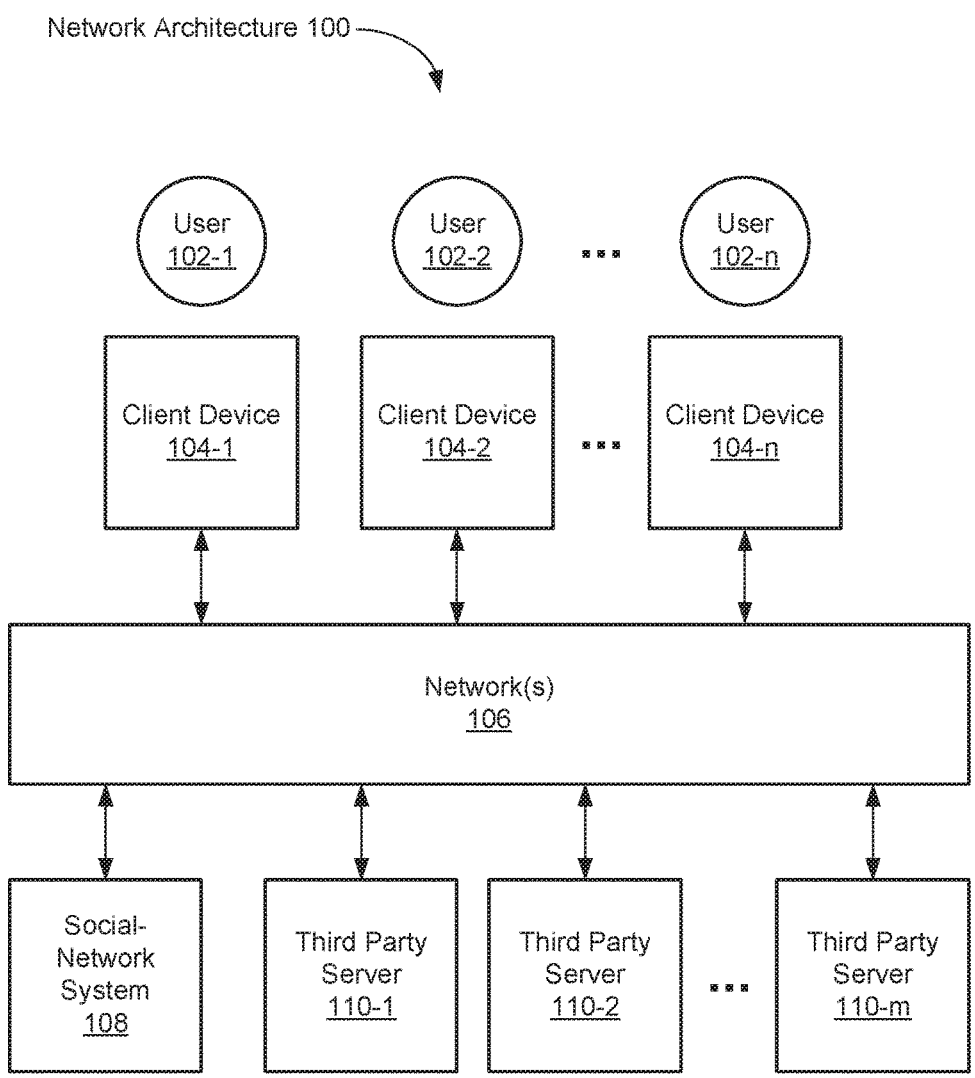
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by posting information (e.g., items of content), such as text comments (e.g., updates, announcements, replies), digital photos, videos, audio files, links, and/or other electronic content. Users of the social-networking service can also annotate information (e.g., items of content) posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social-network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social-network system 108 with the user's location (e.g., "At Home", "At Work", or "In San Francisco, Calif."), and/or update the social-network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, a given third-party server is used to host or provide applications that are used by client devices 104, either directly or in conjunction with the social-network system 108. A given third-party server 110 thus may be associated with a software developer that develops applications. Exemplary applications include, but are not limited to, applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content, such as items of content (e.g., news articles, reviews, message feeds, etc.). Items of content may include embedded content items (e.g., text, photos, videos, audio, and/or other electronic content with which a user may interact, such as interactive maps, games, etc.).

In some embodiments, a given third-party server 110 is a single computing device, while in other embodiments, a given third-party server 110 is implemented by multiple computing devices working together to perform the actions of a server system (e.g., cloud computing).

Service platforms (e.g., social-network system 108, or a provider associated therewith) may also provide a multitude of software-development products (sometimes abbreviated as "products" or "development products") for assisting developers in creating, managing, adding functionality to, and analyzing the performance of their applications. Examples include software-development products for tracking application usage statistics (e.g., for users of an application) or for integrating functionalities of a service platform with an application (e.g., using login credentials of a social-networking service to access an application).

Figure 6A:
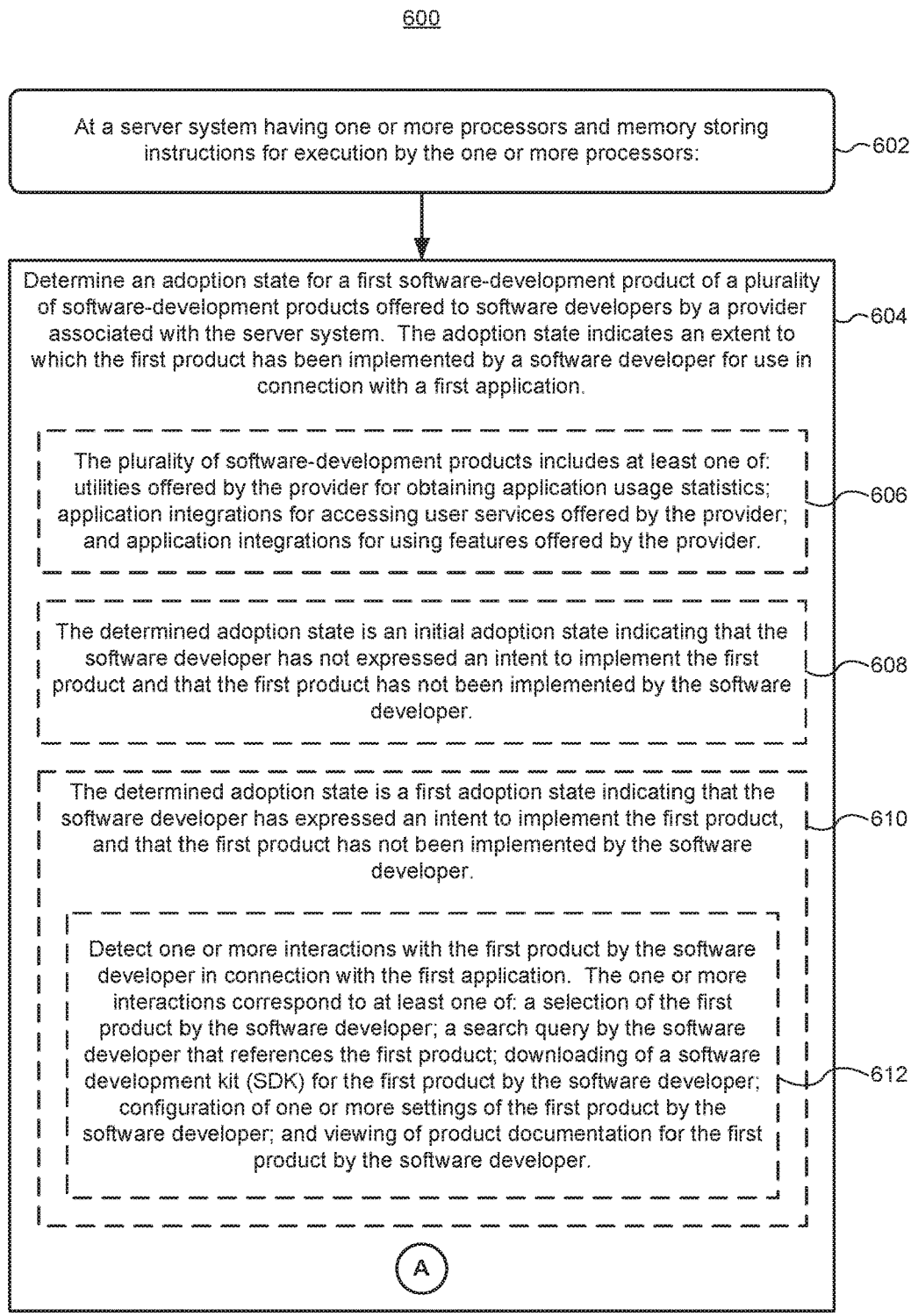
FIGS. 6A-6C are flow diagrams illustrating a method of facilitating implementation of software-development products based on product adoption states, in accordance with some embodiments.
Figure 6B:
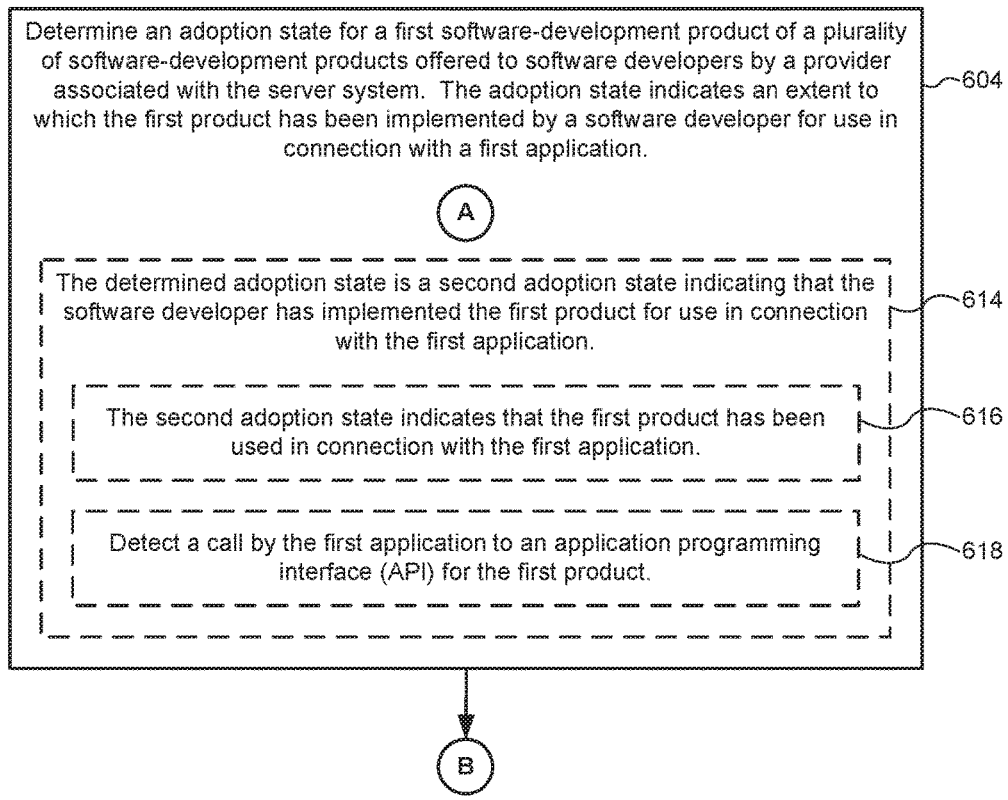
Figure 6C:
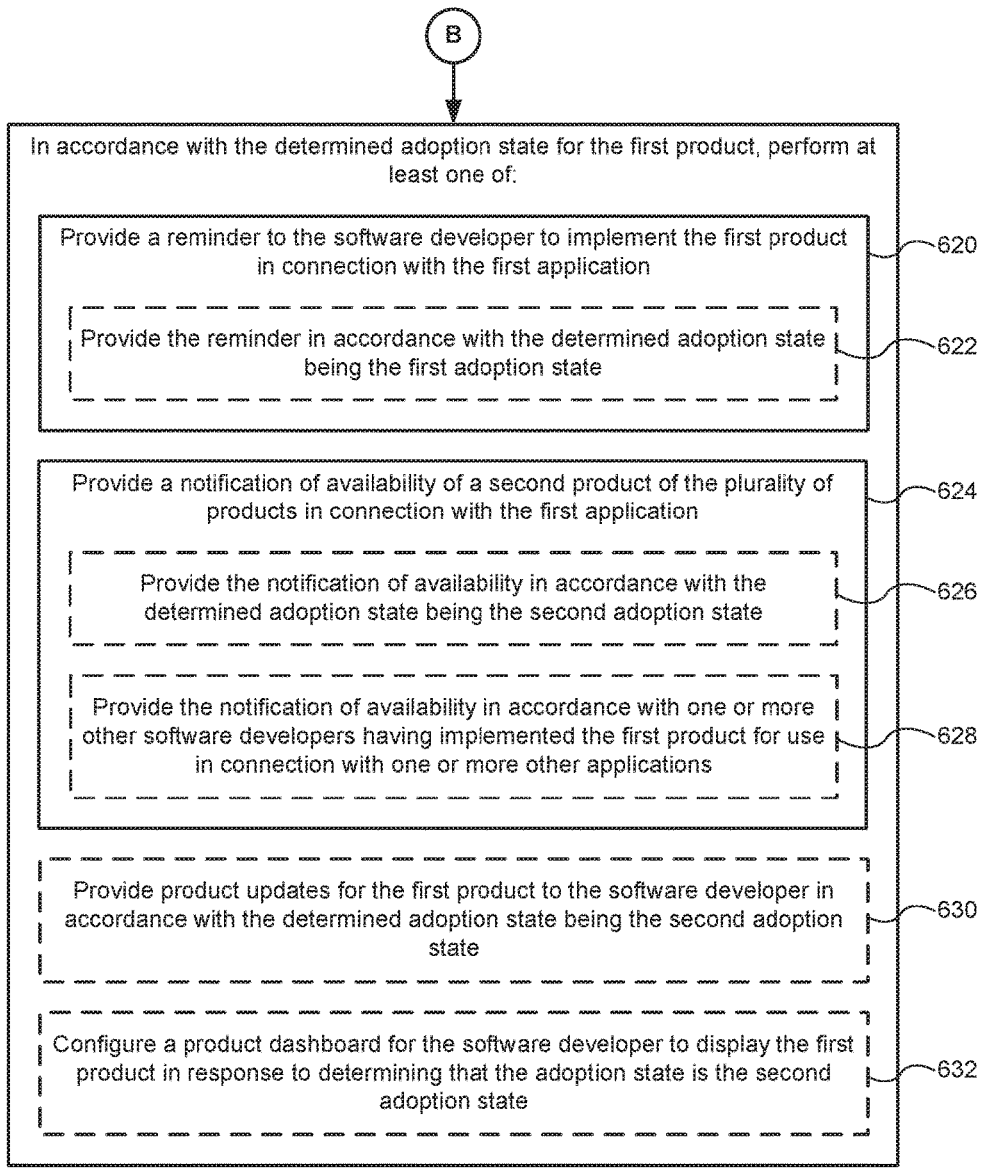

As described in greater detail throughout, to facilitate the implementation and use of development products, the service platform may track the adoption of development products by developers. Based on product adoption states (e.g., developer has expressed interest in, but has not implemented the product; developer has fully implemented the product; etc.), the service platform may perform a variety of actions, including providing a reminder to developers to implement a particular development product (e.g., a reminder to finish configuring a product) or providing notifications of availability of other development products (e.g., other products related to a development product already adopted by a developer). Other actions that a service platform (or provider associated therewith) may perform are described for the method 600 (FIGS. 6A-6C).

Figure 2:
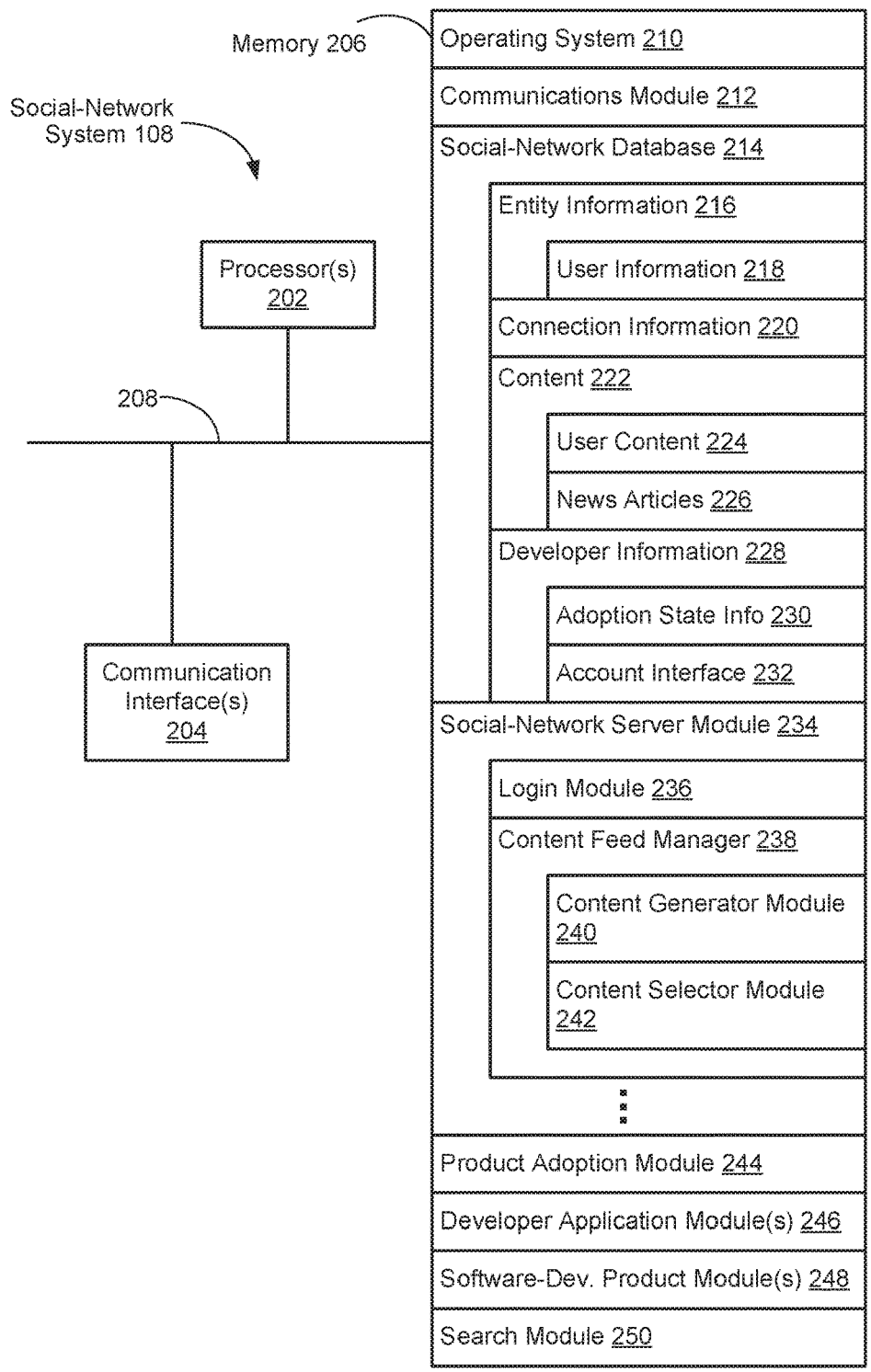
FIG. 2 is a block diagram illustrating an exemplary social-network system in accordance with some embodiments.

FIG. 2 is a block diagram illustrating an exemplary social-network system 108 in accordance with some embodiments. The social-network system 108 (or a server system for a provider of software-development products, associated for example with the social-network system 108) typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
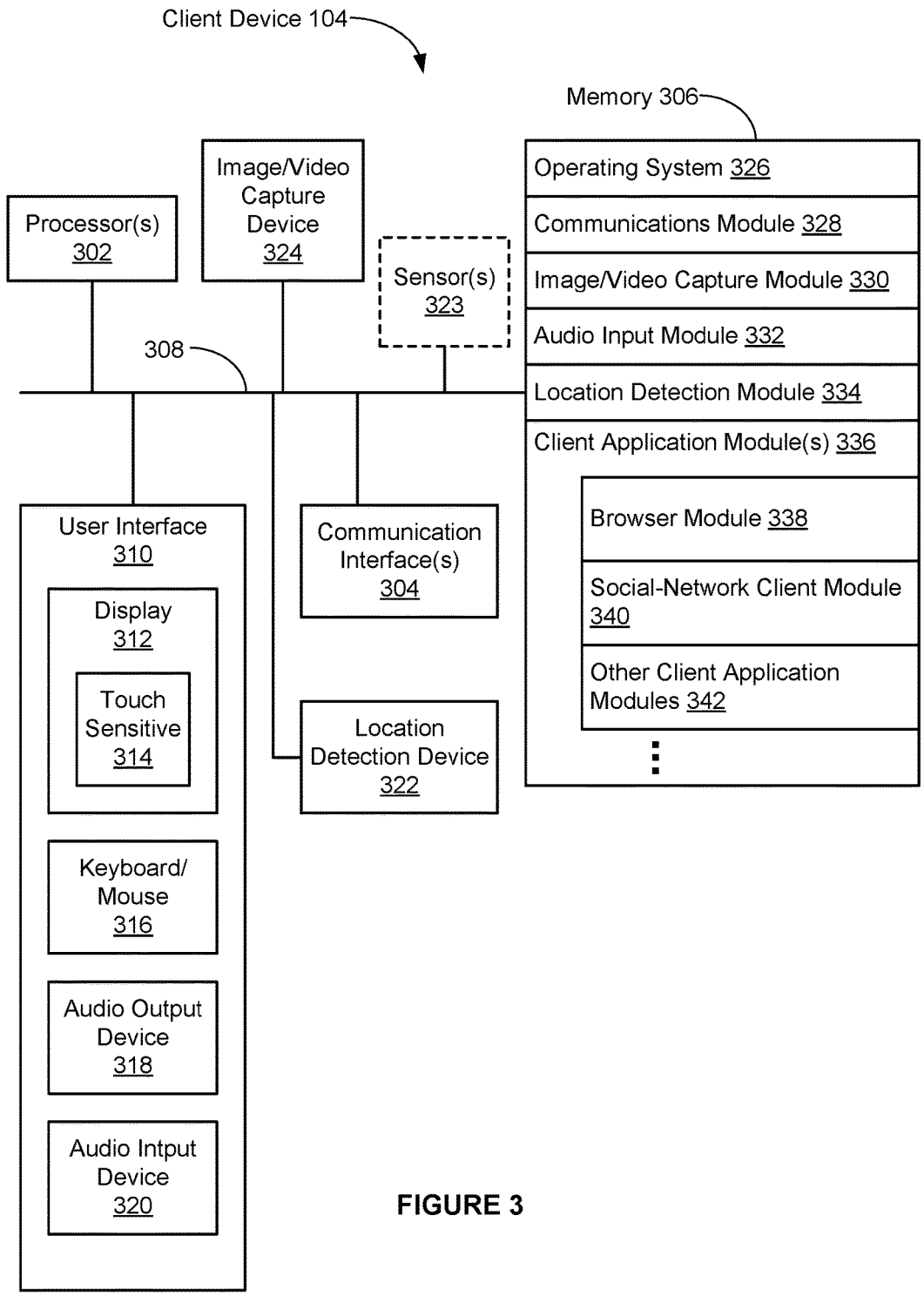
FIG. 3 is a block diagram illustrating an exemplary client device in accordance with some embodiments.
Figure 4A:
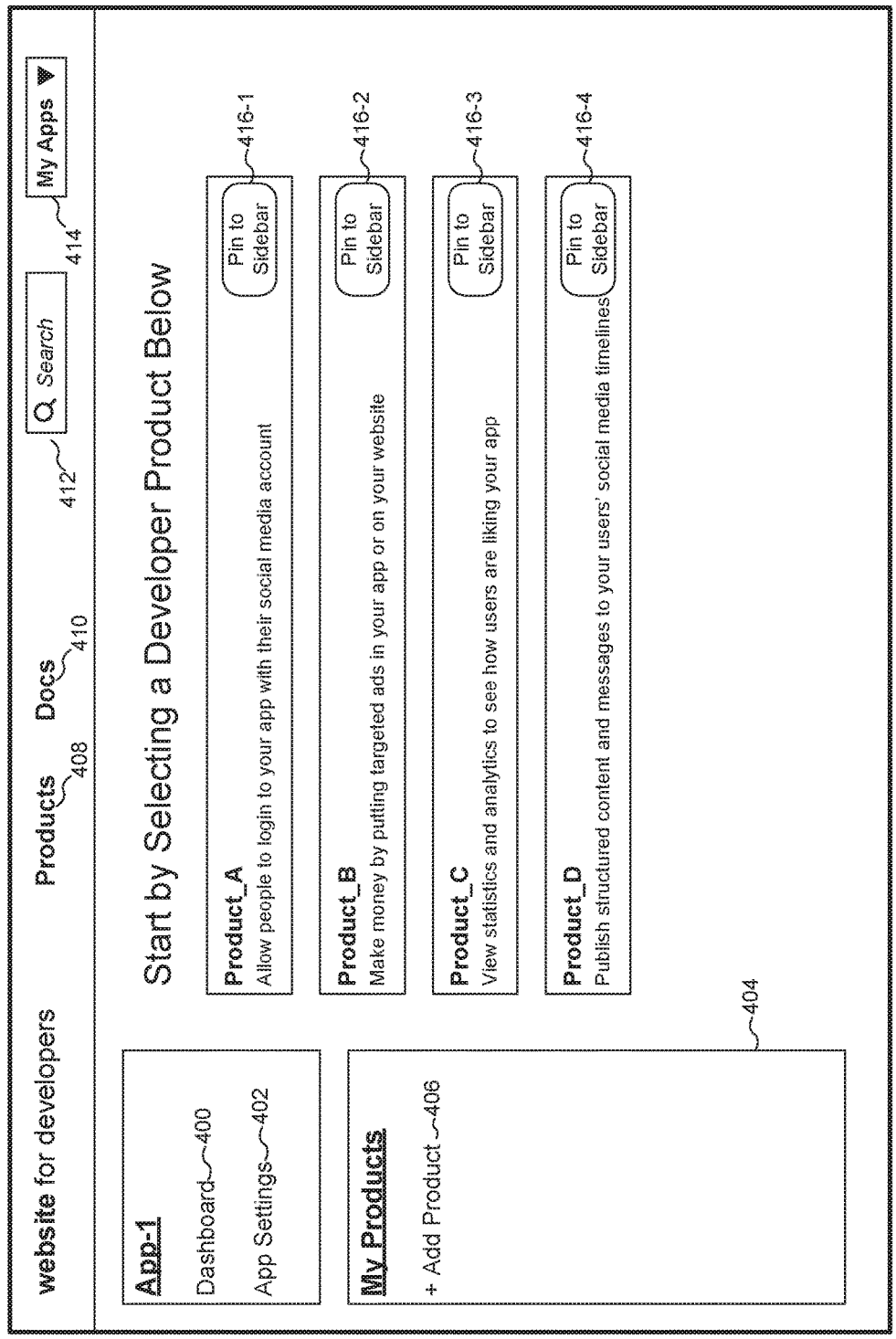
FIGS. 4A-4B illustrate exemplary graphical user interfaces (GUIs) for implementing software-development products for developer applications, in accordance with some embodiments.
Figure 4B:
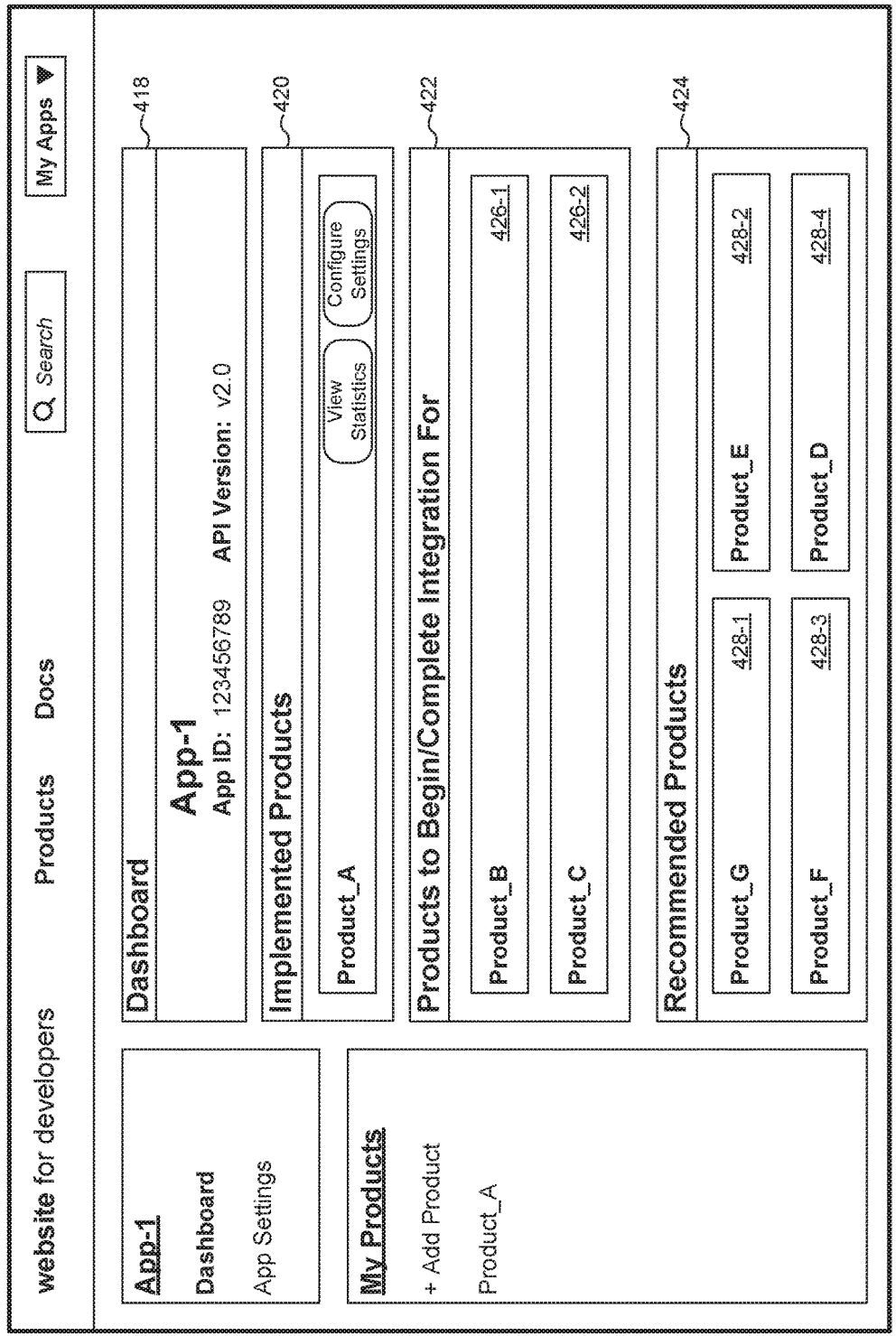

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106)
- a social-network database 214 for storing data associated with the social network (or a provider of software-development products), such as:
    - entity information 216, such as user information 218; connection information 220;
    - content 222, such as user content 224 (e.g., items of content with embedded content items, such as text, photos, videos, audio, and/or other electronic content with which a user may interact, such as interactive maps, games, etc.) and/or news articles 226; and/or
    - developer information 228, such as account information (e.g., registration information, credentials, etc.), adoption state information 230 indicating development product adoption states with respect to developer applications, and account interface information 232 (e.g., ranking/ordering of recommended products in a developer dashboard, FIG. 4B);
- a social-network server module 234 for providing social-networking services and related features (e.g., in conjunction with browser module 338 or social network client module 340 on the client device 104, FIG. 3), which includes:
    - a login module 236 for logging a user 102 or a software developer into the social-network system 108; and
    - a content feed manager 238 for providing content to be sent to clients 104 for display, which includes:
        - a content generator module 240 for adding objects to the social network database 214, such as images, videos, audio files, comments, status messages, links, applications, and/or other entity information 216, connection information 220, or content 222; and/or
        - a content selector module 242 for choosing the information/content to be sent to clients 104 for display;
- a product adoption module 244 for tracking product adoption states (e.g., monitoring developer interactions with development products) and performing actions in accordance with determined adoption states (e.g., providing reminders to implement products, providing product recommendations, providing product updates, etc.);
- developer application module(s) 246 for providing services and accessing features of developer-created software applications;
- software-development product module(s) 248 for assisting developers in creating, managing, adding functionality to, and analyzing the performance of their software applications (e.g., developer application module(s) 246); and/or
- a search module 250 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like." "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 234 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin. Wireless Universal Resource File (WURFL), and the like.

FIG. 3 is a block diagram illustrating an exemplary client device 104 in accordance with some embodiments. The client device 104, which may be used by a user 102 or a software developer, typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam. In some embodiments, the client device 104 includes one or more optional sensors 323 (e.g., gyroscope, accelerometer) for detecting a motion and/or change in orientation of the client device.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices.

Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer by Microsoft, Firefox by Mozilla. Safari by Apple, or Chrome by Google) for accessing, viewing, and interacting with websites (e.g., a social-networking website provided by the social-network system 108, a website for accessing services and features of developer-created software applications, a software-developer website hosted by the social-network system 108 and/or another software provider);
  - a social network module 340 for providing an interface to a social-networking service (e.g., a social-networking service provided by social-network system 108); and/or
  - optional client application modules 342, such as applications for accessing services and features of developer-created software applications, for accessing a service platform (e.g., a software-developer website hosted by the social-network system 108 and/or another software provider) to create/manage applications and implement software-development products (e.g., analytics utilities, integrations for accessing user services offered by the provider, etc.) in connection with the applications. Other modules 342 include, but are not limited to, word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

FIGS. 4A-4B illustrate exemplary GUIs (e.g., as displayed on a client device 104) for implementing software-development products for developer applications, in accordance with some embodiments. These GUIs illustrate the processes described below, including the method 600 (FIGS. 6A-6C). The GUIs may be provided by a web browser (e.g., a website accessed and displayed by web browser module 338, FIG. 3), an application for a social-networking service (e.g., social network module 340), and/or a third-party application (e.g., a client application module 342). While FIGS. 4A-4B illustrate examples of GUIs, in other embodiments, a GUI displays user-interface elements in arrangements distinct from the embodiments of FIGS. 4A-4B.

FIG. 4A illustrates a GUI for software developers for implementing software-development products for a newly registered application "App-1" created by a developer. GUIs like those shown in FIGS. 4A and 4B for other applications created by the same developer may be accessed via drop-down affordance 414.

In FIG. 4A, the GUI includes a link 400 ("Dashboard") to a "Dashboard" page for displaying information for an application (e.g., analytics, application details, etc.), and for viewing and configuring settings for a development product (e.g., view product reminders and recommendations, configuring products, etc., described with respect to FIG. 4B). The GUI also includes a link 402 ("App Settings") to a page for configuring various settings for the application.

The GUIs shown in FIGS. 4A and 4B provide multiple avenues through which software developers can implement and configure software-development products (e.g., for tracking application usage analytics; for using messaging functionality of a service platform to communicate with users of applications; etc.) for use in connection with their applications. For example, the GUI in FIG. 4A includes a link 408 ("Products") to a list of available development products, which may be displayed (e.g., in a page or a dropdown menu) for browsing and selecting development products for use in connection with an application (App-1). In this example, development products are also accessible via a search box 412 ("Search") in which users may enter a search query for locating development products. Optionally, documentation 410 ("Docs") for software-development products is also accessible.

Additionally and/or alternatively, development products may be accessed and configured via sidebar 404. Selecting any of affordances 416-1 thru 416-4, for example, causes a respective development product to be added to the sidebar 404 (e.g., selecting affordance 416-1 causes Product_A to be pinned to the sidebar 404, FIG. 4B). In some embodiments, selection of a development product from the sidebar 404 links developers to a page (not shown) in which settings for the development product may be configured.

FIG. 4B illustrates a GUI for displaying a dashboard for App-1. In addition to the user interface elements shown in FIG. 4A, the GUI in FIG. 4B includes an application information section 418, an implemented products section 420, a reminders section 422, and a recommendations section 424. Although not shown, in some implementations, the GUI in FIG. 4B also includes a section for viewing analytics for the application.

In some embodiments, application information section 418 displays various details of the application, including, but not limited to, an application ID (123456789) and API version (v2.0).

In some implementations, the implemented products section 420 lists one or more development products (e.g., Product_A) that have been fully implemented by the developer in connection with a corresponding application (e.g., App-1). Usage statistics, configuration settings, and/or other related settings or information for the implemented product may be accessed through the implemented products section 420 (e.g., through respective affordances in section 420) in some implementations.

In some implementations, reminders section 422 displays one or more reminders for implementing software-development products in connection with the application (App-1). In this example, reminders 426-1 and 426-2 are displayed for Product_B and Product_C. Selection of a reminder allows the developer to access configuration settings for the respective development product. As described for the method 600 (FIGS. 6A-6C), in some implementations, development products for which reminders are provided (and displayed in reminders section 422) are selected based at least on respective adoption states for the development products. For example, a reminder Product_B may be provided due to the developer of "App-1" having previously viewed documentation for Product_B (e.g., via the link 410 for "Docs," FIG. 4A).

In some implementations, recommendations section 424 displays one or more notifications of availability for development products in connection with the application (App-1). For example, the development products may be used in or with the application. Notifications 428-1 thru 428-4 are displayed for various development products (e.g., Product_D, Product_E, Product_F, and Product_G). Selection of a notification 428 may cause a variety of actions to be performed for implementing a respective product (e.g., adding a product to the sidebar 404, accessing a configuration page for the product, accessing product documentation for the product, etc.). As described for the method 600 (FIGS. 6A-6C), in some implementations, development products for which notifications are provided (and displayed in recommendations section 424) are selected and ranked based at least on respective adoption states for the development products, with respect to the application (App-1) and/or other applications. For example, notification 428-1 for Product_G may be provided due to the developer of "App-1" having shown no previous intent to implement Product_G and a threshold number of other developers of applications (e.g., similar to "App-1") having implemented Product_G.

The GUIs shown in FIGS. 4A-4B are described in greater detail below in conjunction with the method 600 of FIGS. 6A-6C.

Figure 5:
FIG. 5 illustrates an exemplary data structure that specifies adoption states of software-development products for multiple applications, in accordance with some embodiments.

FIG. 5 illustrates the adoption state information table 230 in memory 206 of social-network system 108, as shown in FIG. 2. The adoption state information table 230 is an exemplary data structure that specifies adoption states of software-development products for multiple applications, in accordance with some embodiments The adoption state information table 230 includes a plurality of entries, each of which specifies an adoption state (e.g., 0, 1, 2, . . . ) for a given software-development product (e.g., Product_A, Product_B, . . . ) with respect to a developer application (e.g., App-1, App-2, App-3, . . . ). Referring to the example shown, Product B has an adoption state of "1" with respect to "App-1," and an adoption state of "0" with respect to "App-2" and "App-3."

Adoption states indicate an extent to which a software-development product has been implemented by a software developer for use in connection with an application. In this example, adoption state "0" corresponds to initial adoption state indicating that the software developer has not expressed an intent to implement a corresponding product and that the corresponding product has not been implemented by the software developer. Adoption state "1" corresponds to an adoption state indicating that the software developer has expressed an intent to implement a corresponding product, and that the corresponding product has not been implemented by the software developer. Adoption state "2" corresponds to an adoption state indicating that a software developer has implemented the corresponding product for use in connection with the corresponding application. Additional adoption states are possible. For example, an adoption state may indicate partial implementation or a degree of partial implementation.

Based on the adoption states specified in the adoption state information table 230, the service platform (e.g., social-network system 108) performs one or more actions in connection with a corresponding application (e.g., providing a reminder to complete implementation or providing a notification).

Various adoption states and actions performed in accordance with the adoption states are described below for the method 600 (FIGS. 6A-6C). Furthermore, while the adoptions states shown here are represented numerically and fall within a predefined range (e.g., 0 to 2), adoption states may take additional and/or alternative forms (e.g., binary flags, character strings, etc.) and may correspond to one or more distinct and/or related extents of implementation. Moreover, adoption state information table 230 may be a single table (as shown) or may optionally comprise a plurality of tables (e.g., a table for each developer, for each application, etc.).

FIGS. 6A-6C are flow diagrams illustrating the method 600 of facilitating implementation of software-development products based on product adoption states, in accordance with some embodiments. The method 600 is performed (602) at a server system (e.g., social-network system 108. FIGS. 1 and 2) having one or more processors and memory storing instructions for execution by the one or more processors. FIGS. 6A-6C correspond to instructions stored in a computer memory (e.g., memory 206 of the social-network system 108, FIG. 2) or other computer-readable storage medium.

In the method 600, the server system determines (604) an adoption state for a first software-development product (e.g., Product_A, FIGS. 4A-4B and 5) of a plurality of software-development products offered to software developers by a provider associated with the server system. The adoption state indicates an extent to which the first product has been implemented by a software developer for use in connection with a first application (e.g., App-1, FIGS. 4A-4B and 5).

In accordance with the determined adoption state for the first product (FIG. 6C), the server system performs at least one of: providing (620) a reminder to the software developer to implement the first product in connection with the first application, and providing (624) a notification of availability of a second product of the plurality of products in connection with the first application. Various adoptions states and actions performed in accordance with the adoption states are described further below with respect to FIGS. 6A-6C.

As previously described, service platforms (e.g., social-network system 108) provide software-development products for assisting developers in creating, managing, adding functionality to, and analyzing the performance of their applications. Referring to FIG. 6A, in some embodiments, the plurality of software-development products includes (606) at least one of: utilities offered by the provider for obtaining application usage statistics (e.g., analytics for user engagement); application integrations for accessing user services offered by the provider; and application integrations for using features offered by the provider.

User services accessed using the application integrations may include services for facilitating payment transactions (e.g., between users and developers associated with a social-networking service), messaging (e.g., with a customer base), providing feedback (e.g., liking, providing comments, etc.), sharing content (e.g., publishing content to a social media feed of a user of the application), and/or other services or features accessible to users (e.g., user features accessible within the social-networking service provided by the social-network system 108).

Features offered by the provider may relate to features for advertising (e.g., advertising the developer's application within the social-networking service), accessing user data (e.g., user profile or activity data), publishing developer content (e.g., creating social media content, such as a developer page within the social-networking service), pushing notifications to users through a service associated with the provider (e.g., sending push notifications to users through a social-networking service provided by the social-network system 108), and/or other features for adding functionality to developer applications.

Utilities and application integrations may be installed or implemented using code supplied by the provider (e.g., software development kits (SDKs), APIs, etc.).

In some embodiments, the determined adoption state for the first product is (608) an initial adoption state indicating that the software developer has not expressed an intent to implement the first product and that the first product has not been implemented by the software developer (e.g., adoption state "0" for Product_D, FIG. 5). In some implementations, the first product corresponds to the initial adoption state upon registration with the provider by the software developer (e.g., completing initial registration process for creating an application). In some implementations, at least some of the plurality of software-development products offered by the provider are associated with default adoption states (e.g., upon completing registration, the default adoption state for all development products is the initial adoption state).

In some embodiments, the determined adoption state for the first product is (610) a first adoption state indicating that the software developer has expressed an intent to implement the first product, and that the first product has not been implemented by the software developer (e.g., adoption state "1" for Product_B, FIG. 5).

In some implementations, determining (604) that the adoption state for the first product is the first adoption state includes detecting (612) one or more interactions with the first product by the software developer in connection with the first application (e.g., detected while using the developer website. FIGS. 4A-4B). The one or more interactions correspond to at least one of: (A) a selection of the first product by the software developer (e.g., selecting affordance 416 for pinning a product to the sidebar 404, FIG. 4A; selecting a product from the sidebar 404, FIG. 4B; selecting a product from a list of development products via link 408, FIG. 4A; etc.) (B) a search query by the software developer that references the first product (e.g., typing Product_A in search box 412, FIG. 4A); (C) downloading of a software development kit (SDK) for the first product by the software developer; (D) configuration of one or more settings of the first product by the software developer; and (E) viewing of product documentation for the first product by the software developer (e.g., via link 410, "Docs," FIG. 4A).

In some embodiments, respective degrees of the one or more detected interactions (e.g., duration of interaction, frequency with which a particular interaction is detected, total number of times a particular interaction is detected, etc.) are determined, and the adoption state is determined to be in the first adoption state in accordance with the respective degree of a detected interaction satisfying a threshold (e.g., viewing product documentation for the first product at least a specified number of times).

Referring now to FIG. 6B, in some embodiments, the determined adoption state for the first product is (614) a second adoption state indicating that the software developer has implemented the first product for use in connection with the first application (e.g., adoption state "2" for Product_A, FIG. 5). In some implementations, the second adoption state indicates (616) that the first product has been used in connection with the first application (e.g., used by the software developer; used or deployed for use by one or more users of the first application; etc.). In some implementations, the second adoption state indicates that the first product has been configured for use (e.g., all, a threshold number of, or specific settings for the first product have been set or accepted by the software developer).

In some embodiments, determining (604) that the adoption state for the first product is the second adoption state includes (618) detecting a call by the first application to an application programming interface (API) for the first product (e.g., API call detected from a developer application module 246, FIG. 2, or client application module 342, FIG. 3, to the development product module 248, FIG. 2). In some implementations, detecting the call by the first application to the API comprises querying a database storing records of API calls made by a plurality of applications that includes the first application (e.g., social-network database 214, FIG. 2). Querying the database may be performed with a predefined frequency (e.g., daily) or schedule (e.g., every Monday), and/or in response to a developer action in connection with the first application (e.g., logging into an account for managing an application).

In some embodiments, a respective adoption state for a third product of the plurality of products indicates an extent to which the third product has been implemented by the software developer for use in connection with the first application (e.g., adoption state of "1" for Product_B with respect to App-1, FIG. 5), and the respective adoption state for the third product is distinct from the determined adoption state for the first product (e.g., adoption state of "2" for Product_A with respect to App-1, FIG. 5).

In some embodiments, a respective adoption state for the first product with respect to a second application distinct from the first application indicates an extent to which the first product has been implemented by the software developer for use in connection with the second application. The respective adoption state for the first product with respect to the second application is distinct from the determined adoption state for the first product with respect to the first application (e.g., referring to FIG. 5, Product_C has an adoption state of "1" for App-1 and an adoption state of "0" for App-2).

Referring now to FIG. 6C, in some embodiments, a reminder is provided (620) to the software developer to implement the first product in connection with the first application. Reminders may be any type of electronic communications sent to the software developer (e.g., reminder displayed in a reminders section 422 of a software developer website, FIG. 4B). In some implementations, the reminder is provided (622) in accordance with the determined adoption state being the first adoption state (i.e., the software developer has expressed an intent to implement the first product, and the first product has not been implemented by the software developer).

In some embodiments, a notification of availability of a second product of the plurality of products (distinct from the first product) is provided (624) in connection with the first application. In some implementations, the notification of availability is a recommendation to implement the second product (e.g., products shown in recommendations section 424, FIG. 4B).

In some implementations, the notification of availability is provided (626) in accordance with the determined adoption state being the second adoption state (i.e., the software developer has implemented the first product for use in connection with the first application). For example, the server system may provide a notification of availability for the second product based on the fact that the first product has been implemented by the developer, and given that the second product has features related to the first product. In some implementations, the notification of availability is provided (628) in accordance with one or more other software developers having implemented the first product for use in connection with one or more other applications (e.g., Product_G is displayed in recommendations section 424. FIG. 4B, because it has been implemented in connection with App-2 and App-3).

In some embodiments, the notification of availability is further, or alternatively, provided in accordance with one or more factors, including: (A) a number of times product documentation for the second product has been viewed; (B) a number of times a product page for the second product has been viewed; (C) revenue that the second product contributes to the provider; (D) a number of software developers that have implemented the second product; (E) a similarity of the second product to other products that the software developer has implemented (e.g., same development product type/category, such as those described with respect to FIG. 6A and throughout); and/or one or more metrics or characteristics that indicate a development product's popularity, relevance, and/or likelihood of use by a developer receiving the notification.

In some embodiments, product updates for the first product are provided (630) to the software developer in accordance with the determined adoption state being the second adoption state. Product updates may for example add, remove, and/or modify product features.

In some embodiments, a product dashboard for the software developer (e.g., dashboard shown in FIG. 4B) is configured to display the first product (e.g., as an implemented product, as a reminder to implement to first product, as a recommended product, etc.). Some implementations of the product dashboard provide a consolidated interface through which developers may add/remove, configure settings for, and/or view data for development products, without requiring the software developer to further navigate the service platform to access data or settings.

In some implementations, the product dashboard is configured (632) to display the first product in response to determining that the adoption state is the second adoption state (e.g., adding Product_A to the implemented products section 420 once it has been implemented, FIG. 4B).

In some implementations, a position in which (and/or a prominence with which) the first product is displayed in the product dashboard is based at least in part on a respective ranking of the first product. The respective ranking of the first product is based on at least one of: the determined adoption state for the first product; a determination of whether one or more other software-development products related to the first product are implemented by the software developer; and any other factors described above (e.g., factors that a notification of availability may be provided in accordance with). Based on a comparison of respective adoption states for a first product and second product with respect to an application (e.g., comparing relative degrees of implementation), the first and second product will have distinct rankings that determine a position (e.g., ordering within a list) or prominence (e.g., size, color, etc.) of display. In connection with a first application, for example, a first product having an adoption state indicating that implementation has a first degree of completion (e.g., 70%) will be positioned higher than a second product having an adoption state indicating that implementation has a second degree of completion (e.g., 30%), wherein the first degree of completion is greater than the second degree of completion.

Although the method 600 describes implementations of a few designated adoption states (e.g., an initial adoption state, a first adoption state, a second adoption state), more or fewer adoption states may exist. Adoption states may compose a range, where a respective position of an adoption state within the range corresponds to an extent of product implementation (e.g., ranging from not implemented, to partially implemented, to fully implemented) or a degree of interest in product implementation (e.g., few or infrequent interactions suggest little intention to implement, whereas many or frequent interactions suggest high intention to implement).

Furthermore, each adoption state may correspond to one or any combination of respective extents of product implementation (e.g., not implemented, partially implemented, fully implemented, etc.) and/or characteristics for deriving a developer's interest in implementing a development product (e.g., any one or combination of detected interactions, such as a selection of a product for configuration, a search query that references a product, downloading of an SDK for a product, etc.).

Any actions (or combinations thereof) performed by the server system (e.g., as described with respect to the method 600, such as providing a reminder to implement a development product, providing a notification of availability of other development products, etc.) may be performed in accordance with any one adoption state or a combination of adoption states. For example, although the method 600 describes implementations in which product updates for the first product are provided (step 630, FIG. 6C) in accordance with the second adoption state (e.g., software developer has implemented the first product for use), additionally and/or alternatively, product updates may be provided in accordance with the first adoption state (e.g., in response to detecting user interactions with a product that has not been implemented).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at a server system having one or more processors and memory storing instructions for execution by the one or more processors:
        determining an adoption state for a first software-development product of a plurality of software-development products offered to software developers by a provider associated with the server system, wherein the adoption state indicates an extent to which the first product has been implemented by a software developer for use in connection with a first application, and the adoption state is one of:
        1) a first state when the software developer has not expressed an intent to implement the first product in connection with the first application;
        2) a second state when the software developer has expressed interest in implementing the first product in connection with the first application, but has not implemented the first product in connection with the first application; and
        3) a third state when the software developer has implemented the first product in connection with the first application, including detecting one or more calls to an API of the first product from the first application; and
        in accordance with a determination that the adoption state for the first product is the first state:
            providing a notification of availability of the first product;
        in accordance with a determination that the adoption state for the first product is the second state:
            providing a reminder to the software developer to implement the first product in connection with the first application; and
        in accordance with a determination that the adoption state for the first product is the third state:
            providing a notification of availability of a second product of the plurality of products in connection with the first application.

2. The method of claim 1, wherein the plurality of software-development products comprises utilities offered by the provider for obtaining application usage statistics.

3. The method of claim 1, wherein the second state corresponds to an initial adoption state upon registration with the provider by the software developer.

4. The method of claim 1, wherein determining the adoption state comprises detecting one or more interactions with the first product by the software developer in connection with the first application, the one or more interactions corresponding to at least one of:
    a selection of the first product by the software developer;
    a search query by the software developer that references the first product;
    downloading of a software development kit (SDK) for the first product by the software developer;
    configuration of one or more settings of the first product by the software developer; and
    viewing of product documentation for the first product by the software developer.

5. The method of claim 1, wherein the third state further indicates that the first product has been used in connection with the first application.

6. The method of claim 1, wherein determining the adoption state is the third state comprises detecting a call by the first application to an application programming interface (API) for the first product.

7. The method of claim 1, further comprising providing product updates for the first product to the software developer in accordance with the determined adoption state being the third state.

8. The method of claim 1, further comprising configuring a product dashboard for the software developer to display the first product in response to determining that the adoption state is the third state.

9. The method of claim 1, wherein providing the notification of availability of the second product is in accordance with a determination that one or more other software developers having implemented the first product for use in connection with one or more other applications.

10. The method of claim 1, wherein the notification of availability of the second product is further provided in accordance with one or more factors selected from the group consisting of:
    a number of times product documentation for the second product has been viewed;
    a number of times a product page for the second product has been viewed;
    revenue that the second product contributes to the provider;
    a number of software developers that have implemented the second product; and
    a similarity of the second product to other products that the software developer has implemented.

11. The method of claim 1, wherein:
    a respective adoption state for a third product of the plurality of products indicates an extent to which the third product has been implemented by the software developer for use in connection with the first application; and
    the respective adoption state for the third product is distinct from the determined adoption state for the first product.

12. The method of claim 1, wherein:
a respective adoption state for the first product with respect to a second application distinct from the first application indicates an extent to which the first product has been implemented by the software developer for use in connection with the second application; and
the respective adoption state for the first product with respect to the second application is distinct from the determined adoption state for the first product with respect to the first application.

13. The method of claim 1, further comprising configuring a product dashboard for the software developer to display the first product, wherein a position in which the first product is displayed in the product dashboard is based at least in part on a respective ranking of the first product, and the respective ranking of the first product is based on at least one of:
the determined adoption state for the first product, and
a determination of whether one or more other software-development products related to the first product are implemented by the software developer.

14. The method of claim 1, wherein:
the second product is distinct from the first product and has features related to the first product;
the first product and the second product are both offered by the provider to software developers; and
the notification of availability of the second product is a recommendation to implement the second product.

15. The method of claim 1, wherein the plurality of software-development products comprises application integrations for accessing user services offered by the provider.

16. The method of claim 1, wherein the plurality of software-development products comprises application integrations for using features offered by the provider.

17. A server system, comprising:
a processor; and
memory storing one or more programs for execution by the processor, the one or more programs including instructions for:
determining an adoption state for a first software-development product of a plurality of software-development products offered to software developers by a provider associated with the server system, wherein the adoption state indicates an extent to which the first product has been implemented by a software developer for use in connection with a first application, and the adoption state is one of:
1) a first state when the software developer has not expressed an intent to implement the first product in connection with the first application;
2) a second state when the software developer has expressed interest in implementing the first product in connection with the first application, but has not implemented the first product in connection with the first application; and
3) a third state when the software developer has implemented the first product in connection with the first application, including detecting one or more calls to an API of the first product from the first application; and
in accordance with a determination that the adoption state for the first product is the first state:
providing a notification of availability of the first product;
in accordance with a determination that the adoption state for the first product is the second state:
providing a reminder to the software developer to implement the first product in connection with the first application; and
in accordance with a determination that the adoption state for the first product is the third state:
providing a notification of availability of a second product of the plurality of products in connection with the first application.

18. A non-transitory computer readable storage medium, storing one or more programs for execution by one or more processors, the one or more programs including instructions for:
determining an adoption state for a first software-development product of a plurality of software-development products offered to software developers by a provider associated with the server system, wherein the adoption state indicates an extent to which the first product has been implemented by a software developer for use in connection with a first application, and the adoption state is one of:
1) a first state when the software developer has not expressed an intent to implement the first product in connection with the first application;
2) a second state when the software developer has expressed interest in implementing the first product in connection with the first application, but has not implemented the first product in connection with the first application; and
3) a third state when the software developer has implemented the first product in connection with the first application, including detecting one or more calls to an API of the first product from the first application; and
in accordance with a determination that the adoption state for the first product is the first state:
providing a notification of availability of the first product;
in accordance with a determination that the adoption state for the first product is the second state:
providing a reminder to the software developer to implement the first product in connection with the first application; and
in accordance with a determination that the adoption state for the first product is the third state:
providing a notification of availability of a second product of the plurality of products in connection with the first application.

* * * * *